Jan. 14, 1964   K. ZWICK ETAL   3,117,493
MACHINE TOOL

Filed Feb. 1, 1961   5 Sheets-Sheet 1

Jan. 14, 1964

K. ZWICK ETAL 3,117,493

MACHINE TOOL

Filed Feb. 1, 1961

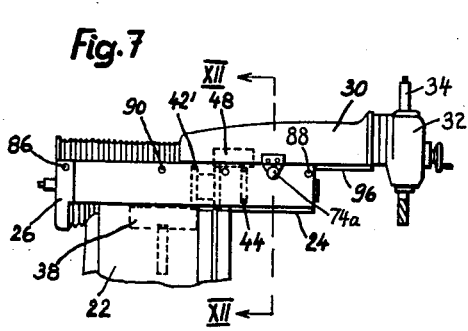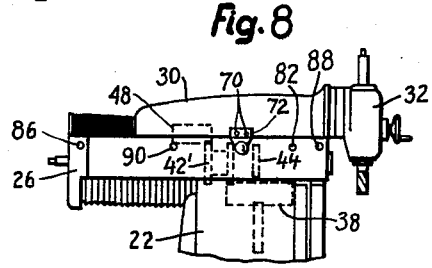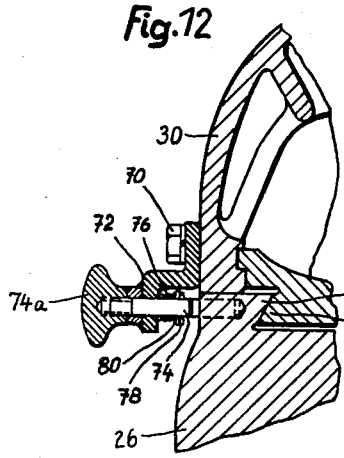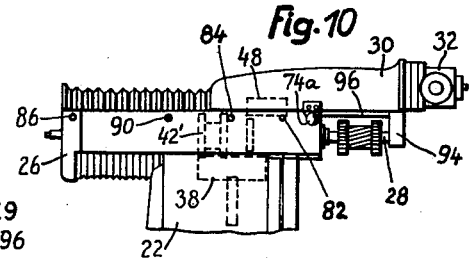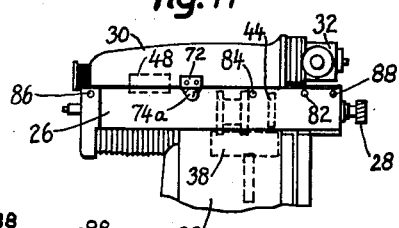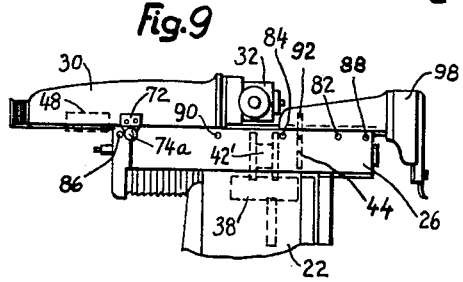

United States Patent Office 3,117,493
Patented Jan. 14, 1964

3,117,493
MACHINE TOOL
Kurt Zwick, Horst Lanzenberger, and Helmut Lamprecht, Munich, Germany, assignors to Hans Deckel, Munich, Germany, and Friedrich Wilhelm Deckel, Lorettohohe, Zug, Switzerland
Filed Feb. 1, 1961, Ser. No. 86,552
Claims priority, application Germany Feb. 5, 1960
14 Claims. (Cl. 90—11)

This invention relates to a machine tool, particularly a milling machine.

An object of the invention is the provision of a generally improved and more satisfactory machine tool capable of a wide variety of operations.

Another object is the provision of improved driving means for the spindle or spindles of a machine tool, particularly a machine tool of the type having two spindles mounted in two separate heads or carriers which are shiftable relative to each other.

Still another object is the provision of an improved machine tool having a main spindle mounted on a main gear case (either directly, or on an intermediate member which is mounted on and adjustable relative to the main gear case) and a second spindle mounted on a separate spindle head which is adjustable relative to the mounting means of the main spindle, there being simple and effective driving means for driving either or both spindles in all effective operating positions thereof.

A further object is the provision of a machine tool having a spindle head mounted for movement along a guideway to various operative positions and also to inoperative position so placed as to allow space for mounting an auxiliary spindle head or special machining head on the same guideway, and especially such an arrangement so designed and constructed that a single operator can handle all necessary parts when mounting or demounting the auxiliary machining head.

A still further object is the provision of simple stop means for limiting the movement of the spindle head along its guideway.

These and other desirable objects may be attained in the manner disclosed as an illustrative embodiment of the invention in the following description and in the accompanying drawings forming a part hereof, in which:

FIG. 7 is a side elevation of the upper part of the gear case, the intermediate carriage, and the spindle head, illustrating other features of the invention;

FIG. 8 is a similar view, showing a different position of the adjustable parts;

FIG. 9 is a similar view, showing an auxiliary machining head in operative position;

FIG. 10 is a similar view, illustrating a different position of the parts and also the use of a supplementary bearing for the main spindle;

FIG. 11 is a similar view showing still another position of the parts; and

FIG. 12 is a fragmentary vertical cross section taken approximately on the line XII—XII of FIG. 7.

Figure 2:
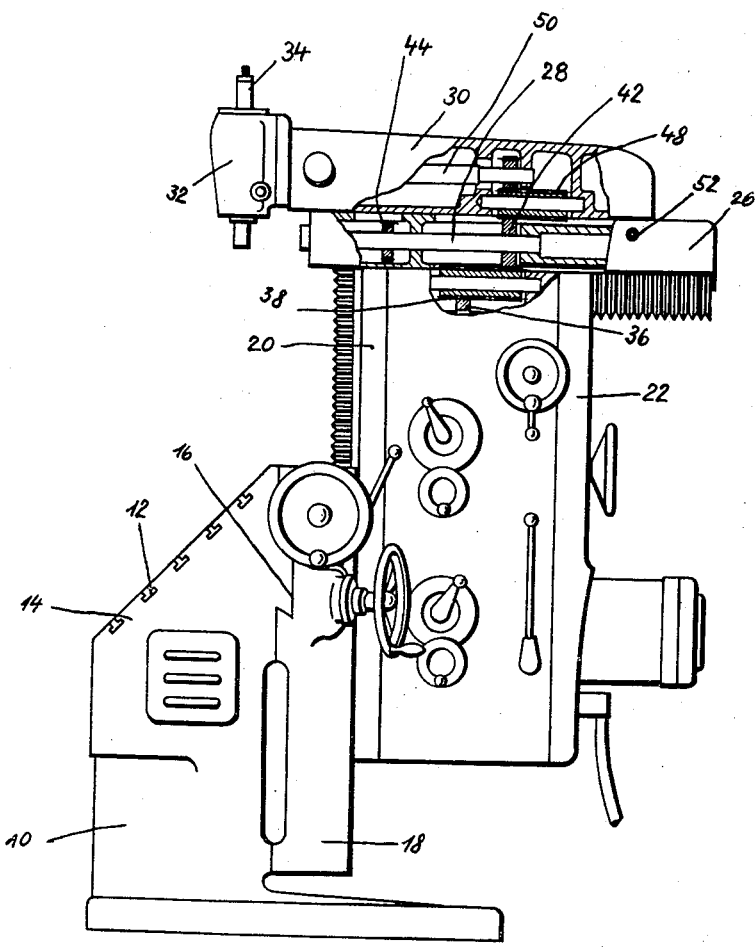
FIG. 2 is a side elevation of the same, with parts broken away and parts in vertical section.

Referring now to the drawings, the lower portion of the machine tool, below the tool spindle and its immediately adjacent driving mechanism, may be of any known form, the details of which are not important for the present invention. For example, there may be a stationary stand or column 10 forming the main base of the machine and having at its top a work supporting surface 14 to which the work may be clamped by the use of conventional undercut clamping slots 12. The work supporting surface 14 is preferably inclined downwardly and forwardly at 45 degrees, as seen in FIG. 2.

The rear of the upright column 10 has a horizontal track or guideway 16, along which moves a slide member or intermediate support 18, the rear side of which in turn has a vertical guideway mating with a vertical guide portion 20 of a gear case 22 constituting the main movable part of the machine tool. In or on this gear case 22 there are a drive motor and the usual conventional drive mechanism or power feed mechanism for moving the case 22 vertically on the slide 18 and for moving the slide 18 horizontally on the base 10, which movements may also be performed manually by suitable hand wheels, as well understood in the art.

At the top of the gear case 22 is a guideway 24 extending horizontally in a direction at right angles to the horizontal direction of the guideway 16. An intermediate carriage or member 26 travels along this guideway 24 and carries a tool spindle 28 which may be referred to as the main tool spindle or the heavy-duty spindle. The intermediate carriage 26, in turn, has a guideway 29 parallel to the guideway 24, and a spindle head 30 is movable along this guideway 29. The spindle head 30 carries at its forward end a boring head 32 having a boring spindle 34. The boring head is swingably mounted on the spindle head so that it may be turned from an upright operative position, where the boring spindle 34 is vertical as in FIG. 2, to an inoperative position where the boring spindle is horizontal as in FIG. 1. In this latter position, no part of the boring head or its spindle extends below the level of the guideway 29; therefore it does not interfere with moving the spindle head 30 rearwardly along the guideway 29, there being ample clearance for the boring head 32 (when turned to this position) to overlie the intermediate carriage 26 as indicated, for example, in FIG. 4.

The gear case 22 contains spindle drive gearing, one gear of which is partially shown at 36. The intermediate gearing between the motor and the gear 36 is of any conventional kind, so is not shown in detail. According to the present invention, the gear 36 meshes with and drives a toothed cylinder or elongated gear 38, the shaft or axle of which is journalled in the gear box 22 and is parallel to the guideway 24 and the main spindle 28. The upper portion of the gear 38 projects through an opening in the top of the gear box 22 and meshes with a gear 42 fixed to the tool spindle 28 or to a suitable driving sleeve surrounding the spindle, thus serving to drive the tool spindle. The spindle 28 (or its surrounding driving sleeve, if there is one) also has fixed to it a gear 44, farther forward than the gear 42, which gear 44 serves to drive a removable machining head 46 (FIG. 4) when the latter is placed on the machine, as further explained below.

The gear 42 meshes not only with the elongated gear 38 in the gear case 22, but also with another elongated gear 48 mounted in the spindle head 30 and serving, when the spindle head 30 is in normal operative position, to drive the boring head 32 or other attachment mounted on the spindle head, through suitable conventional transmission means indicated in general at 50. In the intermediate carriage 26 is a clamping device 52 which serves to clamp fast the spindle head 30 or the auxiliary machining head 46, as the case may be.

Figure 1:
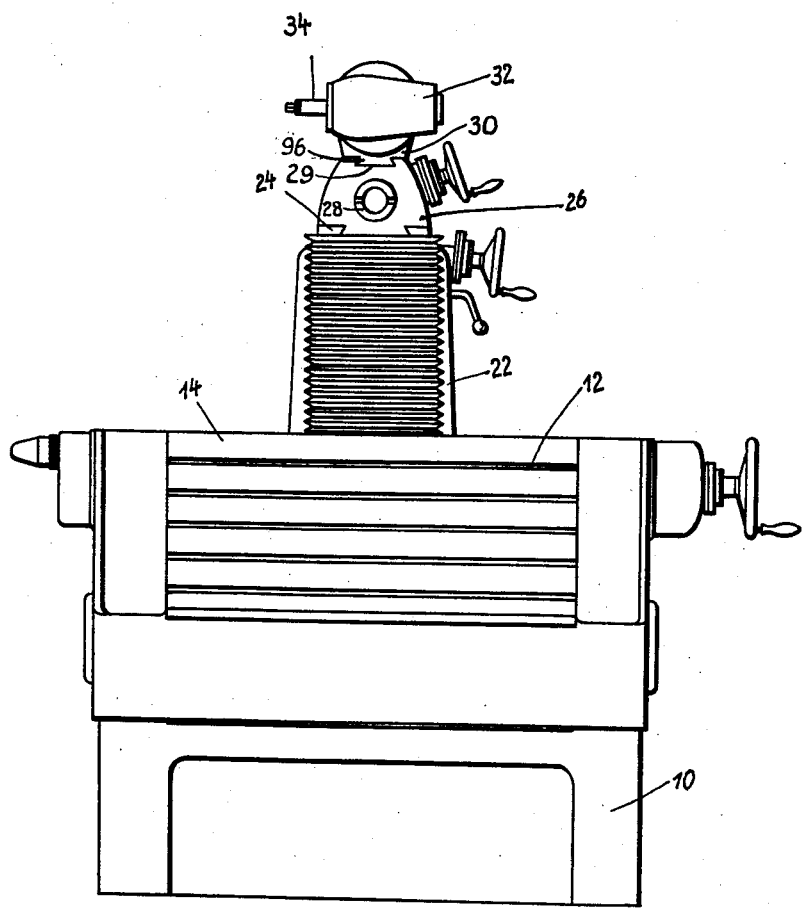
FIG. 1 is a front elevation of a milling machine in accordance with one embodiment of the invention.
Figure 3:
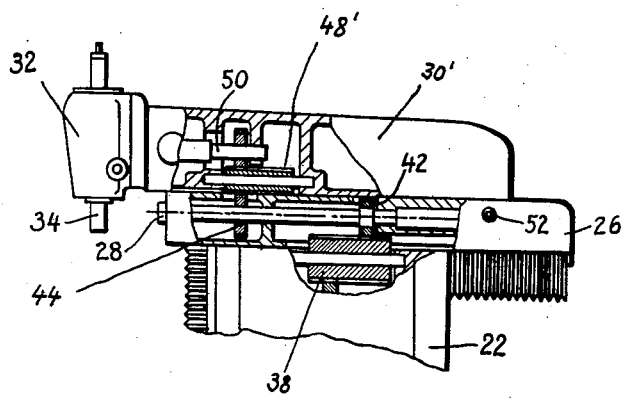
FIG. 3 is a view similar to the upper portion of FIG. 2, illustrating another embodiment of the invention.

FIG. 3 illustrates a slightly different form of spindle head 30', which is in general the same as the spindle head 30 in FIGS. 1 and 2, but differs in some details. In FIGS. 1 and 2, the elongated gear 48 of the spindle head meshes with the rear gear 42 of the intermediate member 26. In FIG. 3, the elongated gear 48' is placed farther forward in its spindle head 30', and it meshes with the forward gear 44 of the intermediate member 26. But in either case, the elongated gear 48 or 48' is sufficiently long (in an axial direction) so that it remains always in engagement with its driving gear (42 or 44, as the case may be) throughout the entire range of longitudinal working movement of the spindle head 30 or 30' relative to the member 26 on which it slides. Similarly, the elongated gear 38 is sufficiently long (in an axial direction) so that it remains in engagement with the gear 42 throughout the entire range of longitudinal working movement of the intermediate carriage 26 relative to the gear case 22.

As already briefly indicated, the spindle head 30 or 30' may be slid rearwardly along the guideway 29 (after the boring head 32 has been turned to a non-interfering position) to make room at the front of the guideway 29 to receive a substitute or auxiliary machining head 46 (FIG. 4) of any desired kind of for any desired purpose or special kind of work. The auxiliary head 46 has, for example, a rotatable tool spindle 50 which is driven, through intermediate transmission members indicated in general at 58, by an elongated gear 56 which meshes with and is driven by the gear 44 in the intermediate carriage 26. The gear 56 is sufficiently elongated (in an axial direction) so that it will remain in mesh with the gear 44 in all working positions of the auxiliary machining head 46 relative to the guideway 29 on which it is mounted.

This feature of being able to move the spindle head 30 or 30' rearwardly along the guideway 29, far enough to provide sufficient room at the front end of the guideway for mounting the auxiliary milling head and connecting it to its drive, is an important feature of the present invention. The spindle head 30 or 30' is usually quit heavy, too heavy to be lifted off of and onto the machine readily by a single man. An auxiliary machining head 46, on the other hand, is ordinarily smaller and lighter, and can be lifted by a single man. In prior machines having provision for the use of an auxiliary machining head, it has ordinarily been necessary to remove the regular spindle head completely from the machine, in order to make room for mounting the auxiliary head. This has required the services of two men in lifting the heavy spindle head off the machine, and in replacing it when it is to be used again, even though one man can handle the auxiliary head alone. This is avoided, however, by the present invention, and one operator alone can make the necessary changeover of the machine. Although the spindle head 30 or 30' can not be lifted by a single operator, it can easily be slid along its guideway 29 by a single operator, with very little effort. Therefore the regular operator, without calling upon anyone else for assistance, can move the spindle head rearwardly to its out-of-the-way position (FIG. 4 or FIG. 9) and can then mount the auxiliary or detachable head needed for special purposes or operations. It may be, for example, a grinding head or a polishing head (either one of which may be represented by the showing at 46 in FIG. 4) or a shaper head or attachment as represented at 98 in FIG. 9, or any other known kind of attachment or auxiliary head.

From what has just been explained, it will furthermore be apparent to those skilled in the machine tool art that this feature of the invention is independent of whether the guideway 29 (which receives the spindle head and the auxiliary head or attachment) is located on an intermediate carriage like 26, or is located directly on the main gear case 22 or some other supporting portion of the machine.

Figure 5:
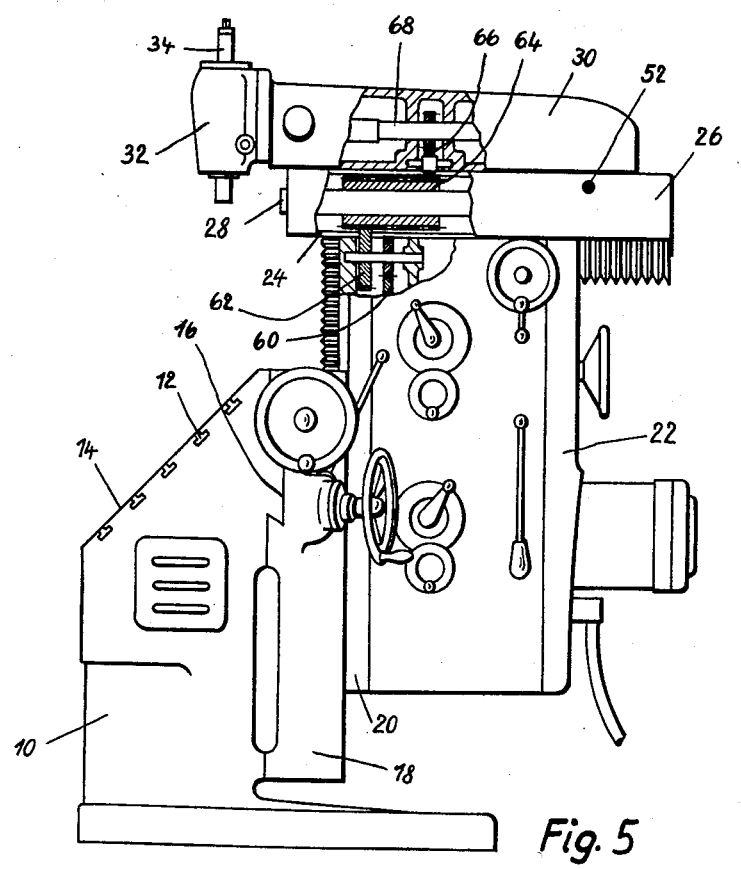
FIG. 5 is a view similar to FIG. 2, showing another embodiment of the invention.

A slightly different construction, employing the same generic principles of the invention, is illustrated in FIG. 5. The lower parts of the machine tool are the same as described before; likewise the intermediate member or carriage 26, and the spindle head 30 with its boring head 32. For such parts, FIG. 5 uses the same reference numerals as FIGS. 1 and 2, and no further description of the parts numbered the same as in FIGS. 1 and 2 is necessary. The difference is merely in the specific details of the driving gears which serve to rotate the upper tool spindle (in the spindle head 30) in all adjusted positions of the latter within its working range.

In this embodiment (FIG. 5) the usual transmission or drive gearing within the gear case 22 includes a gear 60 which drives a gear 62 located near the front edge of the gear case 22 and meshing constantly with an elongated gear or toothed cylinder 64 fixed non-displaceably to the spindle 28 of the intermediate carriage 26, or to a drive sleeve surrounding the spindle. The elongated gear 64, in turn, meshes with a gear 66 in the spindle head 30, and this gear 66, through conventional intermediate transmission members indicated in general at 68, drives the boring or drilling spindle 34 of the boring head 32. Thus with the use of only a single axially elongated gear or toothed cylinder 64, the boring head 32 and spindle head 30 have a very considerable range of movement while maintaining the operative driving connection from the gear 60 in the case 22. First the carriage 26 can be displaced forwardly until only the rear end of the long gear 64 meshes with the gear 62 (with sufficient overlap, of course) and then the spindle head 30 may be moved farther forwardly on the carriage 26 until the gear 66 is at the forward end of the long gear 64, again with sufficient overlap.

Figure 6:
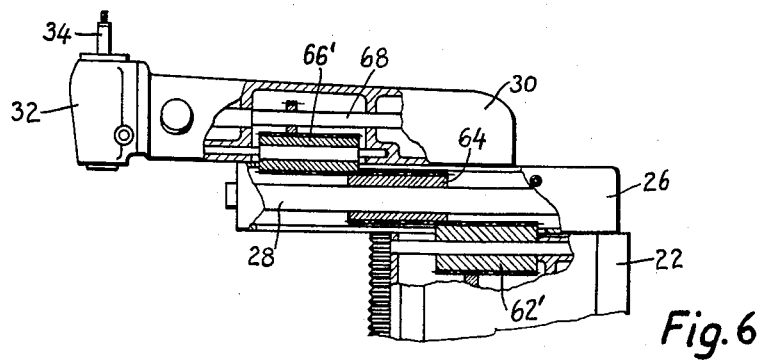
FIG. 6 is a side elevation, with parts broken away and parts in vertical section, of mechanism generally similar to that shown in the upper portion of FIG. 5, but in a slightly different form and a different position of adjustment.

Due to considerations of strength of the intermediate carriage 26, the upper and lower walls of which are interrupted by openings for the upper and lower edges of the gear 64, the gear 64 cannot be made as long as might be desired to obtain the desired range of working movement of the head 30. Moreover, there is a practical limit to the length to which a wide faced (axially elongated) gear can be manufactured. If an even greater extent of forward adjustment of the spindle head 30 is desired than what can be accommodated by using a single elongated gear 64 of the maximum practical length, this can be accomplished by the modified construction shown in FIG. 6, in which one or both of the normal thickness gears 62 and 66 are replaced by wide-face (axially elongated) gears or toothed cylinders 62' or 66', respectively. With such an arrangement, the gear 64 can be placed somewhat further rearwardly (in the intermediate carriage 26) than it is in FIG. 5, and it will still be in mesh with the gear 62' (because of the added length thereof) when the carriage 26 is in its rearmost position of adjustment. This new position (further rearward) of the gear 64 enables the carriage 26 to be adjusted farther forwardly, when desired, without causing disengagement of the gears 62' and 64. The use of the wide-face or axially elongated gear 66' in place of the gear 66 enables the spindle head 30 to be moved still farther forwardly on the carriage 26, without causing disengagement of the gears. Thus the spindle head has a very great working range of horizontal movement, as can be seen from FIG. 6.

Figure 4:
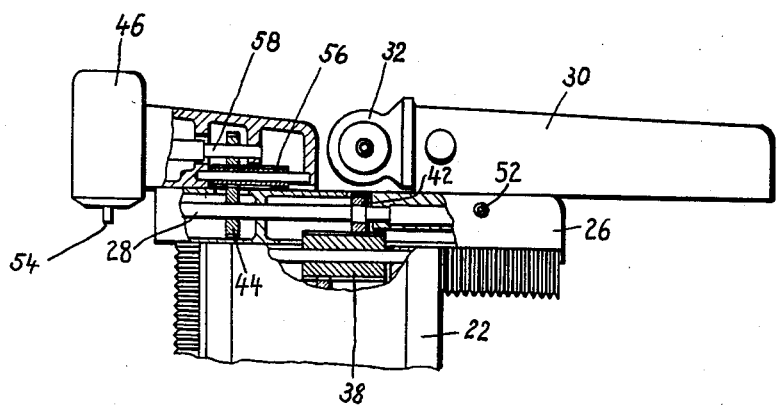
FIG. 4 is a view similar to FIG. 3, showing the spindle head moved rearwardly to an inoperative position and with an auxiliary machining head mounted on the forward part of the guideway of the main spindle head.

If the driving means in the intermediate carriage 26 for driving the gearing in the spindle head or auxiliary head is in the form of an ordinary gear such as 42 and 44 in FIGS 2 and 3, rather than in the form of an elongated gear or toothed cylinder such as 64 in FIG. 5, it is advisable to develop the driven means coming into engagement with this gear to be driven thereby (in the spindle head or the auxiliary machining head) as an elongated gear or toothed cylinder, such as shown at 48 in FIG. 2, at 48' in FIG. 3, and at 56 in FIG. 4. This is particularly advantageous if the connection between the intermediate member 26 and the auxiliary head 46 is in the form of a bayonet coupling. In such a case, the elongated gear or toothed cylinder 56 in the auxiliary head can be brought into meshing engagement with the gear 44 at the time of originally setting the auxiliary head on the guideway, so that there is no longer any need to take special care to see that the tooth of one gear is alined with an intertooth space or gap of the other gear.

In connection with all of these gearing arrangements thus far described, it is pointed out that in each case the gears which transmit the motion from the gear case 22 to the intermediate member 26, and from the intermediate member to the spindle head 30 or the auxiliary head 46, are gears which are firmly fixed to their respective shafts or sleeves, rather than being axially slidable thereon. Thus the present invention avoids completely the use of gears which are splined to and axially slidable along their shafts, as used in some prior art constructions, which axially slidable gears are likely to be more expensive and also more subject to possible vibration or looseness Moreover, the use of elongated gears or wide-face gears as herein disclosed serves to insure that the mating gears remain in constant engagement with each other during at least a considerable part of the working range of adjustment, thereby minimizing the occasions when the mating gears are unmeshed from each other, and minimizing the need for special care and the risk of damage to the gears when they are meshed with or unmeshed from each other.

Stop means assuring reliability of operation are disclosed in FIGS. 7–12, to which reference is now made. On the spindle head 30 there is fastened by means of screws 70, an angle piece 72 in which a bolt member 74 is mounted for movement perpendicular to the direction of displacement of the spindle head 30 A coil spring 76 surrounds the bolt 74 and presses against a washer or disk 80 which is held on the bolt 74 by a cotter pin 78 or the like, so that the force of the spring 76 tends to press the bolt 74 inwardly (to the right as seen in FIG. 12) into the range of the stop pins 82, 84, 86, 88, and 90, which are fastened in the intermediate carriage 26 and project from the side thereof A convenient knob 74a is on the outer end of the bolt 74, by which it may be pulled outwardly against the action of the spring 76 and away from the intermediate carriage 26 so that it will clear each of the stop pins just mentioned during movement of the spindle head along its guideway.

The stop pin 82 is arranged in such position on the member 26 that when the bolt 74 engages with the forward side of the stop pin 82, the rear end of the gear 48 of the spindle head is not quite engaged with its mating gear in the head 26 (this mating gear being here shown diagrammatically as a double gear 42'). The pin 82 is made of such width that when the bolt 74 engages the opposite side of the stop pin 82, the gear 48 is engaged with its driving gear 42' to a sufficient extent for proper driving purposes, this being the position shown diagrammatically in FIG 7. Therefore, when the head 30 is moved from a forward position in a direction rearwardly along its guideway on the head 26, the operator knows that when the bolt 74 comes into contact with the stop pin 82, he must now be careful to engage the mating gears with each other without damaging them. He therefore pulls the bolt 74 outwardly until it clears the end of the pin 82, and moves the head 32 rearwardly gently to engage the gears, until the bolt 74 can drop behind the pin 82 on the opposite or rear side thereof, whereupon the operator knows that the gears are engaged to a sufficient extent Similarly, if the parts are already in the engaged position and it is desired to move the head 30 forwardly, the contact of the bolt 74 with the rear side of the pin 82 is a signal to the operator that disengagement of the mating gears is now about to occur, so he must turn off the power driving means or take other appropriate action to prevent damage to the gear teeth during the final part of the disengaging movement. The positive action required in pulling the head of the bolt 74 outwardly against the force of the spring 76, to enable the bolt to pass the stop pin with which it has been engaged, constitutes an adequate warning to the operator that special care is needed at this point of longitudinal movement of the head 30.

The stop pin 84 is so placed that it serves the same function when the forward end of the elongated gear 48 is to be engaged with or disengaged from the gear 42 or 42'. In the same way as above described, the engagement of the bolt 74 with one side of the stop pin 84 indicates that the forward end of the elongated gear 48 is completely free of its mating gear 42 or 42', while contact of the bolt 74 with the opposite side of the stop pin 84 indicates that the engagement is complete and sufficient for normal driving purposes, as seen in FIG. 8.

The stop pin 86 engages the bolt 74 to define the rearward limit of motion of the head 30, as shown in FIG 9, when the head 30 is displaced all the way rearwardly in order to allow room at the front of the guideway for installing any desired supplementary machining head, such as the one shown at 46 in FIG. 4 or the one shown at 98 in FIG. 9. The gear 44 in the intermediate head 26 then serves to drive the supplementary head 46 or 98, engaging for example with the gear 92 in the auxiliary tool head 98 as in FIG. 9, or with the gear 56 in the auxiliary tool head 46 as in FIG. 4.

A stop pin 88 engages the bolt 74 to define the extreme forward position of the head 30, as seen in FIG. 10. In this position it is possible, for example, to clamp a supplementary bearing 94 on the dovetailed guide 96 at the bottom of the head 30, which slides in the guideway 29 at the top of the head 26, and this supplementary bearing 94 can be used as an outboard bearing for the forward end of the spindle 28 when specially heavy machining is to be performed, for example.

The stop pin 90 cooperates with the bolt 74 to show that the spindle head 30 has reached the position illustrated in FIG. 11, which is a normal rest position approximately centered on the intermediate head or carriage 26, and out of the operating range of the main milling spindle 28 but not sufficiently far back to allow space for mounting an auxiliary machining head 46 or 98 .

As already indicated above, if the machine tool does not have an intermediate head or carriage 26 but rather has a spindle head 30 which rests directly on the main portion 22 of the machine, the connections between the spindle head and the gear case 22 can be the same as the connections above described between the spindle head and the intermediate head 26. The same stop pins above described as being mounted on the intermediate case 26 for cooperation with the bolt 74, can be mounted directly on the gear case 22 if there is no intermediate head 26.

In either case, whether there is or is not an intermediate case 26, it is apparent that the invention provides a very advantageous arrangement for the use of supplementary attachments or machining heads. Contrary to the previous practice, it is no longer necessary to demount or remove the regular spindle head completely in order to make room for the supplementary machining head or attachment. It is but the work of a moment to slide the main head rearwardly along its guideway to a position freeing the space at the front of the guideway for attaching the desired supplementary head or special attachment, and when the need for the supplementary attachment is over, it is but the work of a moment to slide the main head forwardly again to its operative position. This saves a great deal of time heretofore required for demounting and again mounting the main head, and also eliminates the need for a second man to assist the operator in mounting and demounting the heavy spindle head, or the need for a hoist if one operator attempts to do it alone.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A machine tool comprising a supporting member having a substantially horizontal guideway thereon, a spindle head mounted on and movable horizontally along said guideway throughout an operative working range, and a tool spindle rotatably mounted in said spindle head, characterized by the fact that said guideway is sufficiently long so that said spindle head may be moved along said guideway to an inoperative position beyond its working range, thereby freeing a portion of the length of said guideway for attachment thereto of a supplementary tool head and further characterized by driving gear means in said supporting member and located in a position opposite the position of said spindle head when said spindle head is in its working range, to engage with driven gear means in said spindle head, and in a position opposite the position of a supplementary tool head attached to said guideway, to engage with driven gear means in such supplementary tool head.

2. A construction as defined in claim 1, in which the cooperating driving gear means in said supporting member and driven gear means in the head includes at least one gear elongated in an axial direction so as to remain in meshing engagement with a meshing gear throughout a range of adjusting movement of the head along its guideway.

3. A machine tool comprising a main gear case having a substantially horizontal first guideway thereon, an intermediate supporting member mounted on and movable horizontally along said first guideway, said supporting member having a substantially horizontal second guideway thereon arranged substantially parallel to the first guideway, a spindle head mounted on and movable horizontally along said second guideway throughout an operative working range, and a tool spindle rotatably mounted in said spindle head, characterized by the fact that said second guideway is sufficiently long so that said spindle head may be moved along said second guideway to an inoperative position beyond its working range, sufficiently far to free a portion of the length of said second guideway for attachment thereto of a supplementary tool head, thereby enabling a supplementary tool head to be placed in an operating position on said second guideway without the necessity of removing said spindle head from the machine tool, and further characterized by driving gear means in said gear case, cooperating intermediate gear means in said supporting member meshing with and driven by said driving gear means, and cooperating driven gear means in said spindle head operatively connected to said tool spindle and meshing with said intermediate gear means to be driven thereby when said spindle head is in its operative working range on said second guideway, said intermediate gear means being so placed as to be out of mesh with said driven gear means in the spindle head when the spindle head is moved to its said inoperative position on said second guideway and to be available for meshing with other driven gear means in a supplementary tool head mounted on the portion of said second guideway which is freed by movement of said spindle head to its said inoperative position.

4. A construction as defined in claim 3, in which said intermediate gear means includes an axially elongated gear cylinder remaining in meshing engagement with said driving gear means in the gear case throughout a substantial range of movement of said supporting member along said first guideway and remaining in meshing engagement with said driven gear means in the spindle head throughout a substantial working range of movement of said spindle head along said second guideway.

5. A construction as defined in claim 3, in which said driving gear means in the gear case includes an axially elongated gear cylinder remaining in meshing engagement with said intermediate gear means in said supporting member throughout a substantial range of movement of said supporting member along said first guideway.

6. A construction as defined in claim 3, in which said driven gear means in the spindle head includes an axially elongated gear cylinder remaining in meshing engagement with said intermediate gear means in said supporting member throughout a substantial working range of movement of said spindle head along said second guideway.

7. A machine tool comprising a supporting member having a guideway thereon, and a spindle head mounted on and movable along said guideway throughout an operative working range, characterized by the fact that said guideway is sufficiently long so that said spindle head may be moved along said guideway to an inoperative position beyond its working range, thereby freeing a portion of the length of said guideway for attachment thereto of an additional tool head, and further characterized by cooperating fixed and shiftable stop members on said supporting member and said spindle head for engaging each other to determine a given position of said spindle head during movement thereof along said guideway, the shiftable one of said stop members being always out of engagement with the part on which the fixed stop member is mounted and being normally in position to engage the fixed stop member to arrest motion of the spindle head along said guideway and being shiftable in a direction transverse to the direction of said guideway to a position out of engagement with the other stop member so that said spindle head may continue its movement along said guideway after being temporarily stopped by engagement of said stop members.

8. A construction as defined in claim 1, further including cooperating fixed and shiftable stop members on said supporting member and said spindle head for engaging each other to determine a given position of said spindle head during movement thereof along said guideway, the shiftable one of said stop members being always out of engagement with the part on which the fixed stop member is mounted and being normally in position to engage the fixed stop member to arrest motion of the spindle head along said guideway and being shiftable in a direction transverse to the direction of said guideway to a position out of engagement with the other stop member so that said spindle head may continue its movement along said guideway after being temporarily stopped by engagement of said stop members.

9. A construction as defined in claim 1, further characterized by a plurality of fixed stop members projecting from a side of said supporting member and spaced from each other in the direction of said guideway, and a shiftable stop member mounted on said spindle head for movement between an ineffective position in which it will clear said fixed stop members during movement of said spindle head along said guideway and an effective position for engagement with said stop members on said supporting member to determine various positions of said spindle head in its movement along said guideway, said shiftable stop member in all positions being out of engagement with and spaced from said side of said supporting member from which the fixed stop members project.

10. A construction as defined in claim 1, further characterized by a plurality of fixed stop members projecting from a side of said supporting member and spaced from each other in the direction of said guideway, and a shiftable stop member mounted on said spindle head for engagement with said stop members on said supporting member to determine various positions of said spindle head in its movement along said guideway, said shiftable stop member on said spindle head being a spring pressed member rigid in the direction of movement of said spindie head along said guideway and movable in a direction transverse thereto from a normal position for engagement with said fixed stop members to an ineffective position out of alinement with said fixed stop members, said shiftable stop member in all positions being out of engagement with and spaced from said side of said supporting member from which the fixed stop members project.

11. A machine tool comprising a supporting member having a guideway thereon, a second member mounted on and movable along said guideway to any one of a plurality of positions, a fixed stop pin rigidly mounted on one of said members and extending in a direction substantially at right angles to the direction of said guideway, and a movable stop pin mounted on the other of said members for movement axially through a limited range in a direction substantially at right angles to the direction of said guideway and held against movement relatively to the member on which it is mounted in other directions, the position of the movable stop pin on the member on which it is mounted and its axial range of movement being such that at one end of its range of movement it will be out of contact with the other member and will clear the fixed stop pin on the other member as the two stop pins are moved relatively past each other and at the other end of its range of axial movement it will still be out of contact with the other member but will be in position to engage the fixed stop pin on the other member and arrest the motion of said spindle head member along said guideway at a predetermined point.

12. A machine tool comprising a supporting member having a guideway thereon, a second member mounted on and movable along said guideway to any one of a plurality of positions, a first gear rotatably mounted in said supporting member, a second gear rotatably mounted in said second member and adapted to be engaged in meshing relation to said first gear when said second member is moved along said guideway to a predetermined position and to be completely disengaged from said first gear when said second member is moved along said guideway to another predetermined position, a fixed stop element rigidly mounted on and projecting laterally from one of said members, and a movable stop element mounted on the other of said members for movement through a limited range in a direction substantially at right angles to the direction of said guideway and held against movement in other directions relative to the member on which it is mounted, said movable stop element at an inner limit of its range of movement being in position to engage said fixed stop element as said second member is moved along said guideway and at an outer limit of its range being in position to clear said fixed element as said second member is moved along said guideway, said stop elements being so placed on their respective members and the combined thicknesses of said elements in the direction of said guideway being such that when said movable stop element is engaged with one side of said fixed stop element, said gears will be disengaged from each other, and when said movable stop element is engaged with the other side of the same fixed stop element, said gears will be engaged with each other to a sufficient extent so that power may be transmitted through said gears without damage from insufficient engagement.

13. A machine tool comprising a supporting member having a guideway thereon, a second member mounted on and movable along said guideway to any one of a plurality of positions, a first gear rotatably mounted in said supporting member, a second gear rotatably mounted in said second member and adapted to be engaged in meshing relation to said first gear when said second member is moved along said guideway to a predetermined position and to be completely disengaged from said first gear when said second member is moved along said guideway to another predetermined position, a fixed stop element rigidly mounted on and projecting laterally from one of said members, a movable stop element mounted on the other of said members for movement through a limited range in a direction substantially at right angles to the direction of said guideway and held against movement in other directions relative to the member on which it is mounted, said movable stop element at an inner limit of its range of movement being in position to engage said fixed stop element as said second member is moved along said guideway and at an outer limit of its range being in position to clear said fixed element as said second member is moved along said guideway, said stop elements being so placed on their respective members and the combined thicknesses of said elements in the direction of said guideway being such that when said movable stop element is engaged with one side of said fixed stop element, said gears will be disengaged from each other, and when said movable stop element is engaged with the other side of the same fixed stop element, said gears will be engaged with each other to a sufficient extent so that power may be transmitted through said gears without damage from insufficient engagement, and a spring acting on said movable stop element to tend to move it from said outer limit to said inner limit of its range, so that said movable stop element will normally engage said fixed stop element as said second member is moved along said guideway, thereby reminding an operator of the impending engagement or disengagement of said gears.

14. A machine tool comprising a first member containing a first shaft mounted for rotation therein and a first gear fixed to said first shaft, a second member containing a second shaft mounted for rotation therein and a second gear fixed to said second shaft and meshing with said first gear, a third member containing a third shaft mounted for rotation therein and a third gear fixed to said third shaft and meshing with said second gear, first guideway means for guiding said second member for longitudinal movement on said first member, and second guideway means for guiding said third member for longitudinal movement on said second member, said three shafts and said two guideway means all being parallel to each other, said machine tool being characterized by the novel feature that said second gear has a relatively wide face materially elongated in the direction of its second shaft, so that said first gear and said third gear may have relatively narrow faces and yet said first gear and said second gear may remain in meshing engagement with each other during a substantial range of longitudinal movement of said second member along said first guideway means and so that said second gear and said third gear may remain in meshing engagement with each other during a substantial range of longitudinal movement of said third member along said second guideway means.

References Cited in the file of this patent
UNITED STATES PATENTS

| | | |
|---|---|---|
| 799,616 | Parkinson | Sept. 12, 1905 |
| 1,903,782 | Eyring | Apr. 18, 1933 |

FOREIGN PATENTS

| | | |
|---|---|---|
| 323,677 | Switzerland | Sept. 30, 1957 |
| 665,218 | Germany | Sept. 20, 1938 |
| 1,062,105 | France | Dec. 2, 1953 |